June 24, 1930.                    N. TROYER                    1,768,015
                              OUTSIDE SOLDER HORN
                              Filed May 24, 1927            2 Sheets-Sheet 1
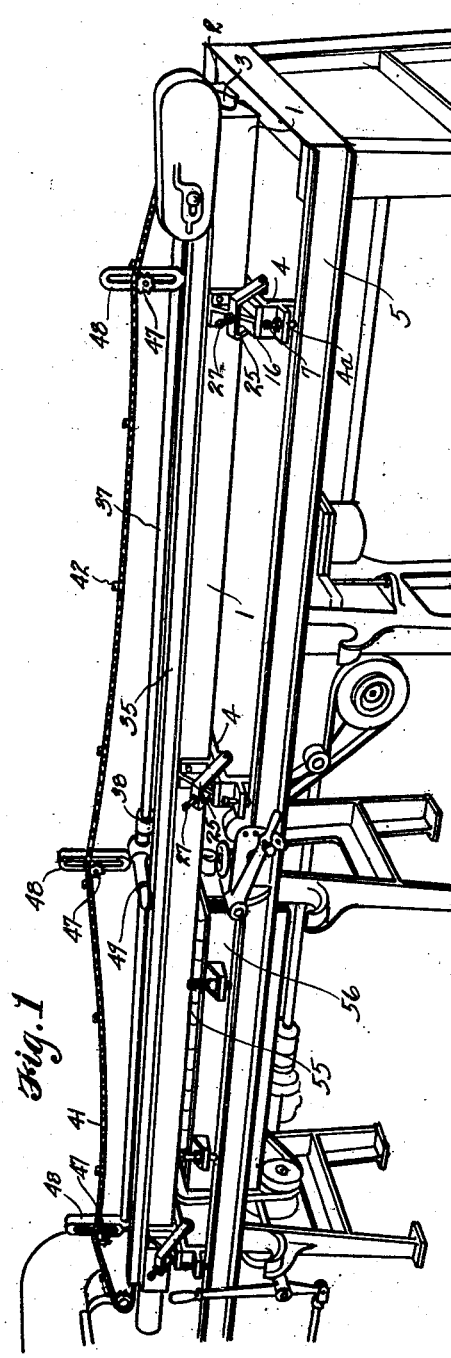
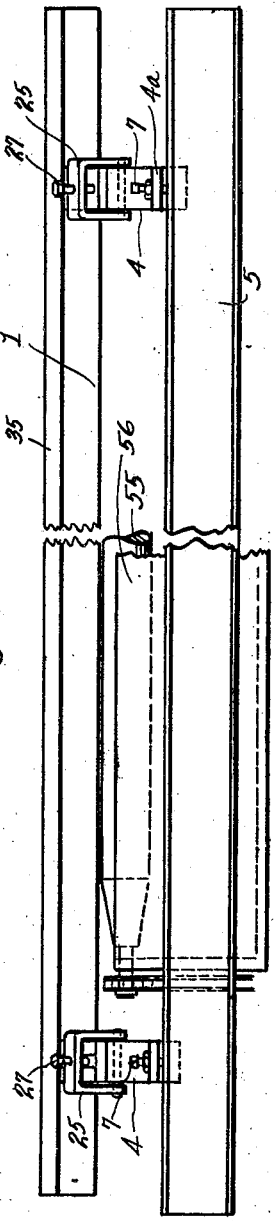
INVENTOR
NELSON TROYER
BY
Richard Cook
ATTORNEY

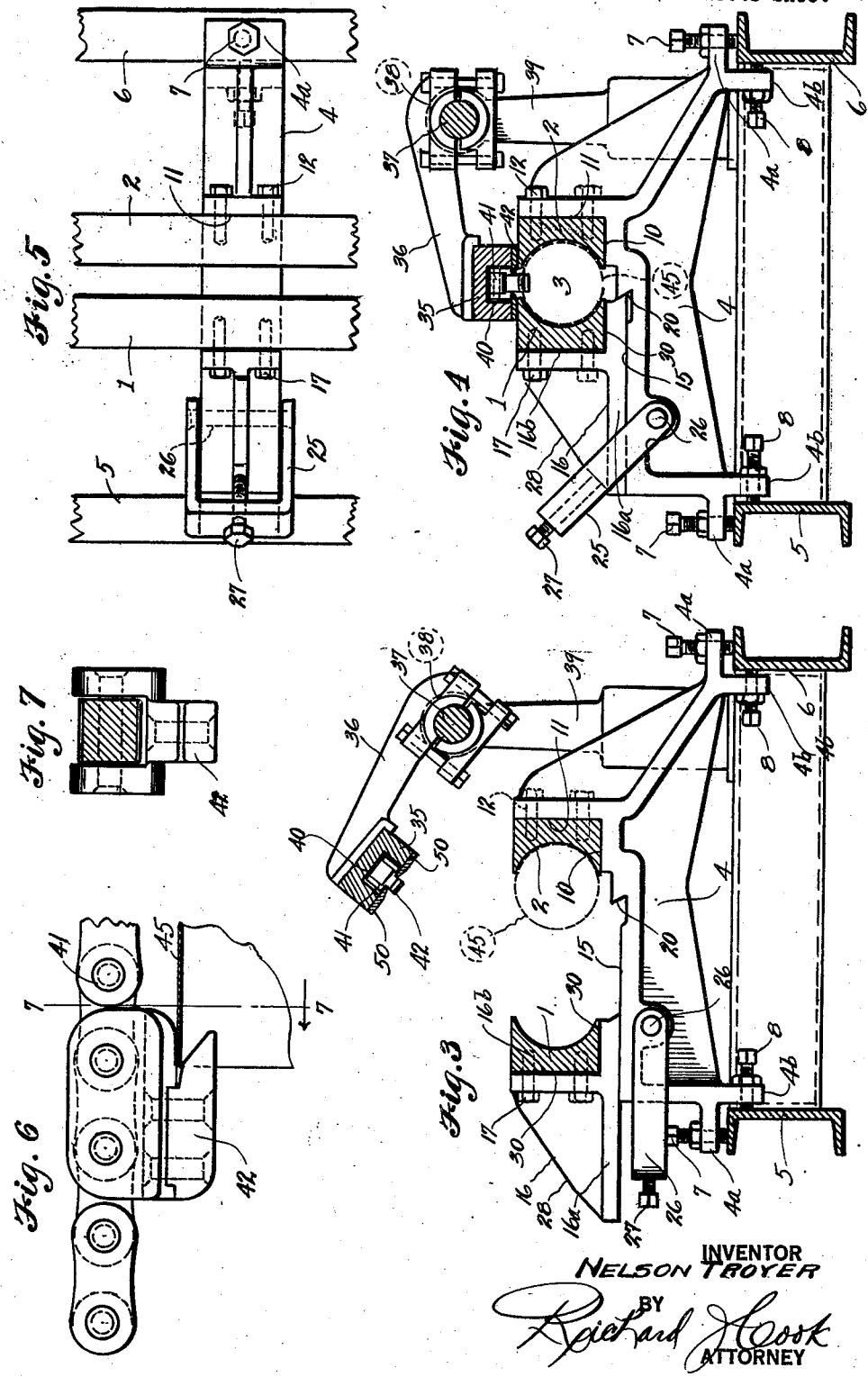

Patented June 24, 1930

1,768,015

UNITED STATES PATENT OFFICE

NELSON TROYER, OF SEATTLE, WASHINGTON, ASSIGNOR TO SEATTLE ASTORIA IRON WORKS, OF SEATTLE, WASHINGTON, A CORPORATION OF WASHINGTON

OUTSIDE SOLDER HORN

Application filed May 24, 1927. Serial No. 193,827.

This invention relates to can making machinery and more particularly to the construction of what is known in the art as the solder horn by means of which the can bodies are guided through their soldering and cooling stages.

It is the principal object of this invention to provide a horn of the outside type and of such rigidity that vibration which is so destructive to the soldered seams of the can bodies is eliminated; that does not warp by reason of uneven heating and which may be easily and quickly opened up or reassembled.

More specifically, the invention resides in the provision of an outside horn of the above character embodying two complemental, opposite side bars which have adjacent faces provided with semi-cylindrically formed channels which together form a closed guideway within which can bodies may be advanced through their soldering and cooling stages, and which are of heavy, rigid construction of solid metal so as to provide for a quick and even absorption of heat to all parts for the prevention of warping.

Other objects of the invention reside in the details of construction of the supports for the horn which provides for adjustment of one part from and toward the other and in the provision of clamps for drawing the parts to and for holding them in assembled relation.

Other objects reside in the various details of construction and combination of parts as is hereinafter described.

In accomplishing these objects, I have provided the improved details of construction, the preferred forms of which are illustrated in the accompanying drawings, wherein—

Figure 1 is a perspective view of a part of a can soldering machine equipped with a solder horn constructed in accordance with the present invention.

Figure 2 is a side view of a part of the horn.

Figure 3 is an enlarged cross sectional view of the horn showing the complemental parts of the horn in open position.

Figure 4 is a similar view of the horn when closed.

Figure 5 is a plan, or top, view of a part of the horn and one of its supporting frames.

Figure 6 is a side view of a part of the conveyer chain whereby can bodies are advanced through the horn.

Figure 7 is a section taken on line 7—7 in Figure 6.

Referring more in detail to the drawings—

1 and 2 designate the two complemental, opposite side bars which constitute the horn. These are disposed closely together in parallel relation and have their inner, or adjacent, surfaces formed with semi-cylindrical channels which together provide a smooth cylindrical passage or guideway 3 extending the length of the horn and through which can bodies may be advanced along the solder roll and through the cooling interval. These two bars are of solid metal construction and with sufficient body that they will not vibrate incidental to operation of the machine and will quickly absorb heat which will be conducted evenly to all parts of the bars and thereby avoid any warping or twisting that would be due to an uneven distribution of heat.

The horn is supported horizontally by means of a plurality of transversely disposed frames 4 which, in turn, rest upon beams 5 and 6 extending parallel with but beneath the horn and which constitute a part of the frame structure of the body making machine. In the present construction, three of the supporting frames 4 are used and these are located near the ends and centrally of the horn and each comprises supports 4ª at its ends which rest on the beams 5 and 6 and through which set screws 7 are threaded to engage with the tops of the beams for adjusting the frame vertically. Horizontally disposed set screws 8 are likewise threaded through vertically depending parts 4ᵇ of the frame against the inner sides of beams 5 and 6 to adjust the frames laterally.

Each frame is provided at one side of the center of the horn with a horizontal seat 10 and a vertically extending shoulder 11 adjacent thereto and the bar 2 is seated on these seats and against the shoulders and is secured thereto by bolts 12 through the shoulder forming parts of the frames. At the other side of their centers, the frames have flat, horizontal surfaces 15 on which brackets 16 are slidably mounted.

Each bracket comprises a flat base portion 16ª seated flatly on the surface 15 and a vertical shoulder 16ᵇ facing the shoulder 11 of the frame and the bar 1 is seated against these shoulders and is secured to the brackets by bolts 17. Thus, by virtue of the slidable mounting of the brackets, the bar 1 may be bodily adjusted from and toward the bar 2.

For the purpose of limiting the distance to which the bar 1 of the horn may be closed toward the bar 2, shoulders 20 are formed rising from the surfaces 15 of the frames against which the inner ends of base portions of the brackets 16 will abut when the horn sections are in proper working relation. These shoulders are inwardly inclined and the ends of the brackets are likewise sloped so that the bracket ends cannot tilt upwardly when seated against the shoulders.

As a means of holding the horn parts in assembled, working relation, I have provided a clamp 25 for each bracket. These clamps are of U-shaped form and embrace opposite sides of the brackets and have their ends pivotally attached by bolts 26 to the frames and have clamping bolts 27 threaded through their base portions adapted to be tightened against webs 28 of the brackets to hold the latter tightly in place. To release the brackets preparatory to opening up the horn, it is only necessary to release the clamping bolts and swing the clamps downwardly and away from the brackets.

After initial assembly of the horn and bracket parts, any irregularity in the alinement of the horn parts may be corrected by the insertion of shims, as at 30, between the side and base surfaces of the bar 1 and the adjacent surfaces of the brackets.

Extending the full length of the horn and centrally located thereover, is a conveyer chain guide bar 35 supported by a plurality of arms 36 extending laterally from a supporting shaft 37 disposed at one side of and parallel with the horn and revolubly mounted in bearings 38 at the upper ends of supporting brackets 39; these brackets being supported from the beams 5 and 6 which are a part of the frame structure of the body machine and are not supported from the horn itself.

Extending lengthwise of the bar 35 is a channel 40 in which the lower run 41 of a conveyer chain belt operates; the conveyer chain having pushers 42 attached thereto at regularly spaced intervals which project downwardly into the guideway 3 between the spaced apart upper edges of the bars 1 and 2 sufficiently for engaging with and advancing the can bodies, designated at 45 in Figure 4, along the horn.

The conveyer belt which may be driven by any suitable mechanism, operates about sprockets at opposite ends of the horn, and its upper run is supported by sprockets 47 on standards 48. A lever 49 is fixed to the shaft 37 and this may be raised to rotate the shaft and to thereby swing the guide bar upwardly from the horn when it is desired to open the latter. When in raised position above the horn, the chain is held in the bar by plates 50—50 that are fixed thereto at opposite edges of the channel 40.

The lower edges of the bars 1 and 2 are spaced apart sufficiently to expose the seams of the can bodies for contact by a revolving solder roll 55 which is mounted closely beneath and parallel with the horn and revolves in a pot 56 in which molten solder is contained; the roll being driven by any suitable mechanism in connection with the driving mechanism of the machine and since its use and method of operation are well known in the art, it will not be further described.

With this type of horn, solder scooping by can bodies in passing over the solder roll is eliminated because of the absence of vibration and the accuracy provided for in the chain guide. This permits the solder to set in the seams without being disturbed.

The particular construction of the horn permits it to be quickly and easily opened up and then to be quickly and accurately closed.

Having thus described my invention, what I claim as new therein and desire to secure by Letters-Patent, is:

1. A solder horn comprising supporting means and two complemental opposite side bars together forming a substantially closed guideway in which can bodies may be advanced through their soldering and cooling stages; one of said bars being fixedly mounted on the supports and the other being slidably adjustable thereon from and toward the fixed bar to open and close the horn.

2. A solder horn comprising a plurality of transverse supports, two complemental, opposite side bars with channels in adjacent faces together forming a substantially closed guideway in which can bodies may be advanced through their soldering and cooling stages; one of said bars being fixedly mounted on said supports and the other being slidably removable while resting thereon from and toward the fixed bar to open and close the horn, and means for holding the adjustable bar in its cooperative relation to the fixed bar and releasable to permit of its being moved outwardly on the said supports.

3. A solder horn comprising horn supports and two complemental opposite side bars with channels in adjacent faces together forming a substantially closed guideway in which can bodies may be advanced through their soldering and cooling stages; one of said bars being fixedly mounted on the supports and the other being slidably adjustable thereon from and toward the fixed bar to open and close the horn, means on the supports for limiting the closing movement of the adjustable bar and clamps for holding it in closed position.

4. In a machine of the character described, a plurality of supporting frames having stop shoulders thereon, brackets slidably mounted on said frames movable from and into end abutment with said shoulders, and a solder horn comprising two complemental opposite side bars together forming a guideway within which can bodies may be advanced through their soldering and cooling stages, one of said bars being fixed to said frames and the other being fixed to said brackets and adjustable from and toward the fixed bar.

5. In a machine of the character described, a plurality of supporting frames having stop shoulders thereon, brackets slidably mounted on said frames movable from and into end abutment with said shoulders, and a solder horn comprising two complemental opposite side bars together forming a closed guideway within which can bodies may be advanced through their soldering and cooling stages, one of said bars being fixed to said frames at one side of said shoulders and the other being fixed to said brackets and adjustable from and toward the fixed bar to open and close the horn and releasable means for engaging the brackets to hold the adjustable bar in assembled relation with the fixed bar.

6. In a machine of the character described, a plurality of supporting frames having stop shoulders thereon, brackets slidably mounted on said frames movable from and into end abutment with said shoulders, and a solder horn comprising two complemental opposite side bars together forming a guideway within which can bodies may be advanced through their soldering and cooling stages, one of said bars being fixed to said frames at one side of said shoulders and the other being fixed to said brackets and adjustable from and toward the fixed bar to open and close the horn and clamping devices pivotally fixed to said frames and adjustable against the brackets to clamp them against the stops and to thereby retain the adjustable bar in its cooperative relation with the fixed bar.

7. In a machine of the character described, in combination, a solder roll, a solder horn comprising two complemental, opposite side bars spaced slightly apart and together forming a guideway within which can bodies may be advanced through their soldering and cooling stages; one of said bars being fixedly mounted and the other being adjustable from and toward the fixed bar, releasable clamping means for holding the bars in cooperative relation, a conveyer guide suspended above the horn but independent thereof and a conveyer chain operable in said guide and having means thereon extendable between the spaced bars of the horn for advancing can bodies through the latter.

8. In a machine of the character described, a plurality of horn supporting frames having inwardly inclined stop shoulders thereon, brackets slidably mounted on the frames having inclined ends adapted to lock beneath the shoulders and a solder horn comprising two complemental opposite side bars together forming a guideway within which can bodies may be advanced through through their soldering and cooling stages; one of said bars being fixed to the frames and the other bar being fixed to the brackets and adjustable from and toward the fixed bar, and clamps fixed to the frames and adapted to be tightened against the brackets to retain the parts of the horn in cooperative relation.

9. In a can soldering machine of the character described, in combination, a solder horn comprising slightly spaced bars forming a substantially closed can guideway, a conveyer supporting guide bar disposed along the horn and covering the space between the horn forming bars, a conveyer operable in the guide and having means thereon extendable between the spaced bars of the horn for advancing can bodies through the latter, and an adjustable supporting means for the conveyer and guide independent of the horn whereby the guide bar may be swung from and into functional relation with the horn.

10. In a can soldering machine of the character described, in combination, a solder horn comprising complemental side bars forming a guideway in which can bodies may be advanced through their soldering and cooling stages and which may be adjusted from each other for opening the horn and which are slightly spaced apart when in functional relation, a conveyer guide bar disposed along the spaced edges of the bars and closing the space between them, a conveyer operable in the guide and having means thereon extendable between the spaced bars for advancing can bodies through the horn, and an adjustable supporting means for the conveyer guide bar independent of the horn and whereby the guide bar and conveyer may be moved away from the horn when the latter is to be opened.

11. In a can soldering machine of the character described, in combination, a solder horn comprising complemental side bars forming a guideway in which can bodies may be advanced through their soldering and cooling stages and which are separable for opening the horn and which are slightly spaced apart when in functional relation, a conveyer guide bar disposed along the spaced edges of the bars, a conveyer operable in the guide and having means thereon extendable between the spaced bars for advancing can bodies through the horn, a shaft supported parallel with the horn, arms fixed to the shaft and to the conveyer guide and means for rotating the shaft to swing the guide and conveyer away from the horn when the latter is to be opened.

Signed at Seattle, Washington, this 9th day of May, 1927.

NELSON TROYER.